United States Patent Office 2,784,216
Patented Mar. 5, 1957

2,784,216

PURIFICATION OF ACRYLONITRILE

David W. McDonald, Texas City, Tex., assignor to Monsanto Chemical Company, St. Louis, Mo., a corporation of Delaware No Drawing. Application December 28, 1954,
Serial No. 478,186

7 Claims. (Cl. 260—465.9)

This invention relates to acrylonitrile and more specifically to a process for its purification.

Acrylonitrile is a well known article of commerce and is widely used in the preparation of various types of synthetic resins and fibers. It is also a valuable intermediate in the preparation of other organic compounds. In most applications, particularly when used in the preparation of synthetic resins or fibers, it is necessary that acrylonitrile of exceptional purity be used. Most of the processes used for the preparation of acrylonitrile simultaneously produce, in addition to acrylonitrile, minor amounts of carbonyl-containing compounds, particularly methyl vinyl ketone. Acrylonitrile containing minor quantities of methyl vinyl ketone is most unsatisfactory for many applications.

It is an object of this invention to provide a process for the purification of acrylonitrile.

It is a particular object of this invention to provide a process for the removal of minor amounts of methyl vinyl ketone from acrylonitrile.

Additional objects will become apparent from the description of the process of this invention.

It has now been discovered that the methyl vinyl ketone content of acrylonitrile containing minor amounts of methyl vinyl ketone can be substantially reduced by treating the thus contaminated acrylonitrile with a minor amount of a compound selected from the group consisting of the alkali metal and alkaline earth metal hypochlorites. The treatment can be carried out in any convenient manner. Acrylonitrile containing methyl vinyl ketone can be treated with an aqueous solution of the hypochlorite or acrylonitrile containing methyl vinyl ketone can be passed through a bed of solid hypochlorite.

The following examples illustrate the process of this invention:

*Example I*

Approximately 200 grams of acrylonitrile containing approximately 700 parts by weight of methyl vinyl ketone per million parts by weight of acrylonitrile (p. p. m.) is vigorously agitated with 50 ml. of an approximately 0.1% aqueous solution of sodium hypochlorite for a period of 15 minutes at a temperature of approximately 30° C. The acrylonitrile layer is separated from the reaction mixture and on analysis is found to contain only 400 p. p. m. of methyl vinyl ketone.

*Example II*

Approximately 50 grams of acrylonitrile containing approximately 700 p. p. m. of methyl vinyl ketone is poured through a 15-cm. bed of solid calcium hypochlorite contained in a 1-cm. inside diameter glass tube at a temperature of approximately 30° C. The acrylonitrile issuing from the bed of calcium hypochlorite contains significantly less methyl vinyl ketone.

The preceding examples illustrate particular embodiments of the novel process of this invention. Substantial variations in the conditions set forth in these examples is possible without departing from the scope of this invention. For example, any of the alkali metal and alkaline earth metal hypochlorites can be used in this process. These include the sodium, potassium, lithium, magnesium and calcium hypochlorites. The reaction can be carried out by treatment of the acrylonitrile with either an aqueous solution of the hypochlorite or by treatment with the solid hypochlorite. When an aqueous solution of the hypochlorite is used, the concentration of the hypochlorite in the aqueous solution can be varied substantially as for example, from 0.05% to 10%, depending upon the solubility of the particular hypochlorite used. Even higher concentrations of the hypochlorite can be used if desired. The quantity of the hypochlorite used is also subject to substantial variation and it is preferably employed in excess of that required to react with the methyl vinyl ketone contained in the acrylonitrile.

The treatment of acrylonitrile in accordance with the process of this invention can be carried out over a wide temperature range, varying from 0° C. to approximately 78° C., the boiling point of acrylonitrile. To prevent any substantial loss of acrylonitrile the reaction is preferably carried out at a temperature below about 40° C.

After the reaction is complete substantially pure acrylonitrile can be recovered in any convenient manner well known to those skilled in the art. Distillation of the acrylonitrile from the reaction mixture affords a simple and economical method of recovery.

What is claimed is:

1. A process for the purification of acrylonitrile containing methyl vinyl ketone which comprises treating said acrylonitrile with a minor amount of a compound selected from the group consisting of the alkali metal and the alkaline earth metal hypochlorites.

2. A process for the purification of acrylonitrile containing methyl vinyl ketone which comprises treating said acrylonitrile with an aqueous solution of a compound selected from the group consisting of the alkali metal and the alkaline earth metal hypochlorites.

3. A process for the purification of acrylonitrile containing methyl vinyl ketone which comprises treating said acrylonitrile with an aqueous solution of sodium hypochlorite.

4. The process as described in claim 3 wherein the treatment is carried out at a temperature below about 40° C.

5. A process for the purification of acrylonitrile containing methyl vinyl ketone which comprises treating said acrylonitrile with a minor amount of a solid compound selected from the group consisting of the alkali metal and alkaline earth metal hypochlorites.

6. A process for the purification of acrylonitrile containing methyl vinyl ketone which comprises treating said acrylonitrile with solid calcium hypochlorite.

7. A process for the purification of acrylonitrile containing methyl vinyl ketone which comprises treating said acrylonitrile with a minor amount of solid calcium hypochlorite at a temperature below about 40° C.

References Cited in the file of this patent

UNITED STATES PATENTS

| | | |
|---|---|---|
| 2,305,103 | Osgood | Dec. 15, 1942 |
| 2,678,945 | Taylor | May 18, 1954 |
| 2,703,330 | Bloch et al. | Mar. 1, 1955 |

FOREIGN PATENTS

| | | |
|---|---|---|
| 670,782 | Germany | Jan. 27, 1939 |